(12) United States Patent
Cunningham

(10) Patent No.: US 6,302,265 B1
(45) Date of Patent: Oct. 16, 2001

(54) FOLD-OVER CONVEYOR ASSEMBLY

(75) Inventor: John Cunningham, Comanche, TX (US)

(73) Assignee: CMI Corporation, Oklahoma City, OK (US)

( * ) Notice: Subject to any disclaimer, the term of this patent is extended or adjusted under 35 U.S.C. 154(b) by 0 days.

(21) Appl. No.: 09/510,874

(22) Filed: Feb. 22, 2000

(51) Int. Cl.⁷ .................................................. B65G 21/10
(52) U.S. Cl. ..................... 198/632; 198/313; 198/861.3
(58) Field of Search ........................... 198/861.2, 861.3, 198/313, 632

(56) References Cited

U.S. PATENT DOCUMENTS

| | | | |
|---|---|---|---|
| 3,444,987 | * | 5/1969 | Palmer ................................. 198/313 |
| 4,427,104 | * | 1/1984 | Reid, Jr. .............................. 198/313 |
| 5,333,725 | * | 8/1994 | Douglas .............................. 198/632 |
| 5,443,351 | * | 8/1995 | Pettijohn ............................ 414/523 |
| 6,129,196 | * | 10/2000 | Lapper et al. ..................... 198/313 |

* cited by examiner

Primary Examiner—Christopher P. Ellis
Assistant Examiner—Mark A. Deuble
(74) Attorney, Agent, or Firm—Emrich & Dithmar

(57) ABSTRACT

A conveyor assembly having upper and lower truss portions includes a hinge mechanism structurally arranged to be secured to the upper truss and lower truss portions. Rotational movement of the hinge mechanism lowers the lower truss portion while simultaneously positioning the upper truss portion in a plane substantially parallel to the plane of the lower truss portion.

9 Claims, 5 Drawing Sheets

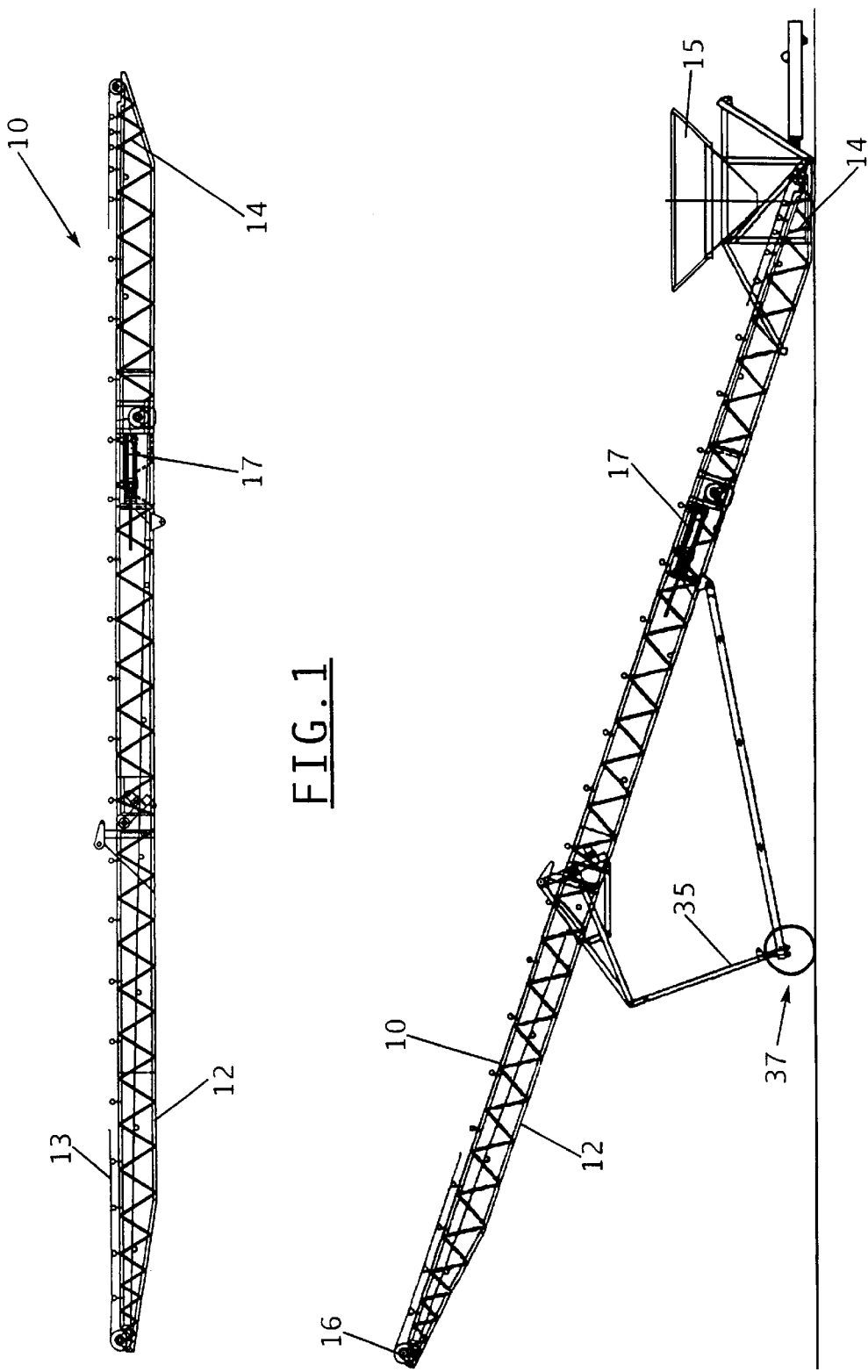

FOLD-OVER CONVEYOR ASSEMBLY

BACKGROUND OF THE INVENTION

The present invention relates to an elongated conveyor assembly which includes a pivotal hinge assembly structurally arranged on the conveyor assembly to fold-over a portion of the conveyor assembly in a vertical plane relative to the plane of the non-folded conveyor assembly.

At the present time, elongated portable conveyor assemblies must be folded to a collapsed position to permit movement of the conveyor assembly from one job location to another. Such folding operations may include the use of a crane which supports the elongated conveyor assembly in the operative position wherein the conveyor assembly extends from a lower loading point to an elevated discharge point. When it is desired to move the conveyor assembly from one work location to another, the supporting crane must lower the elongated conveyor assembly onto the ground to permit the conveyor assembly to be folded by selectively decoupling predetermined lengths of the conveyor assembly from the remaining lengths of the conveyor to permit either vertical stacked folding or horizontal sideways folding. The resultant folded conveyor assembly may provide an accordion-type folded conveyor assembly wherein predetermined lengths of the conveyor are folded in a horizontal plane or provide a fold-over condition wherein the conveyor lengths are stacked in vertical plane with respect to the body of the conveyor assembly. However, such stacked conveyor assemblies are time consuming and expensive.

Also, if it is desired to fold the conveyor assembly in a vertical plane with respect to the body of the conveyor assembly, some prior art structures require multiple sets of hydraulic cylinders and complex folding mechanisms to lower the conveyor assembly to the ground and then fold the conveyor assembly at multiple positions along the length of the conveyor assembly. Again, such prior art structures are extremely complex and expensive and, therefore, have found limited acceptance in the marketplace.

An additional foldable framework for a belt conveyor is described in U.S. Pat. No. 5,333,725. In this patent, a foldable framework is connected to a single power operated cylinder which is operative to cause a portion of the movable support frame of the conveyor assembly to pivot about a universal joint and to position a portion of the conveyor assembly substantially in a vertical perpendicular plane with respect to the body of the non-folded portion of the conveyor assembly. In such a position, the conveyor assembly may then be stacked or stored around other equipment for transport between work sites. However, such a foldable structure does not provide a system or structure which folds a conveyor assembly in a vertical plane with respect to the body of the conveyor assembly for movement of the folded conveyor assembly between work sites.

SUMMARY OF THE INVENTION

One object of the present invention is to provide a novel hinge assembly which is adapted to be predeterminely mounted to a conveyor assembly to permit the fold-over of a portion of the conveyor assembly in a plane substantially parallel relative to the plane of the non-folded portion for transporting the conveyor assembly from one job site to another job site.

It is further object of the present invention to provide a novel hinge assembly or mechanism which is engageable with a belt conveyor assembly to permit the fold-over of one section of the belt assembly in a plane substantially parallel relative to the plane of the non-folded conveyor section through the use of a single pair of hydraulic cylinders.

It is still another object of the present invention to provide a hinge assembly or mechanism mounted to a conveyor assembly which permits the locking of the conveyor assembly in a single operative plane and which permits the positioning of a section of the conveyor assembly in a vertical stacked, substantially parallel plane with respect to the plane of the section of non-folded conveyor assembly.

In accordance with the present invention, an elongated conveyor assembly is provided for the movement of aggregate materials, such as sand, cement, grains, rock, gravel or chemicals from a lower receiving point to an upper discharge point. Generally, such conveyor assemblies can be of any length of up to approximately 100 feet and may include belt, screw or chain type conveyor assemblies. When it is desired that the elongated belt, screw or chain conveyor assembly be moved from one work site to another work site, the hinge assembly mounted to the conveyor assembly is energized to pivotally move an upper truss or forward member portion of the conveyor assembly to a fold-over position in a plane substantially parallel with respect to the plane of the lower truss or rearward member portion of the conveyor assembly. At the junction in the conveyor assembly which separates the upper truss member portion from the lower truss member portion, the hinge assembly or mechanism is mounted to the conveyor assembly.

The pivotal hinge assembly in accordance with the present invention and which provides the desired fold-over and hinge support for the upper truss member portion of the conveyor assembly relative to the lower truss member portion of the conveyor assembly is comprised of a pair of pivot frame supports structurally arranged to cooperate with the hinge structure mounted to the abutting ends of the upper truss member portion and the lower truss member portion. The pivot frame supports are, preferably, triangular in shape with the vertex angle of the pivot frame supports anchored to a bottom pivot frame member coupled to a carriage unit. The carriage unit is comprised of an axle having a pair of tires thereon and a forward extending axle brace member which secures the axle and the carriage unit relative to the elongated conveyor assembly.

The upper truss or forward member portion of the conveyor assembly is mounted and secured to the lower truss or rearward member portion of the truss assembly by the hinge assembly or mechanism. The rearward end of the upper truss member portion abuts against the forward end of the lower truss or rearward member portion of the truss assembly when the conveyor assembly is in the raised operating position. The rearward end portion of the upper truss member includes side mounted support plates thereon which support a secondary pivot shaft having two fulcrum arms keyed thereon. The secondary pivot shaft, preferably, extends from between the pair of side mounted support plates across the width of the conveyor truss frame. The forward end portion of the lower truss member portion includes plate members on opposite sides thereof which provide a primary pivot point thereon between the pivot frame support and the lower truss member portion. To each of the primary and secondary pivots, the leg members of the pivot frame supports are respectively mounted and secured thereto for rotational movement. Fulcrum arms are keyed to the secondary pivot shaft and are each respectively secured to the piston portion of hydraulic cylinders that are secured to the plate members mounted on the sides of the lower truss member portion by the cylinder support members. The cylinder support member includes an anchor bracket which secures a brace member which is mounted on the pivot frame support to a connection on the cylinder support member to maintain the pivot frame assembly in a rigid fixed condition when the belt conveyor assembly is in the elongated raised, operative position.

When it is desired to fold-over the conveyor assembly in accordance with the present invention, the hinge assembly is operatively connected to the upper and lower truss portions of the conveyor assembly and the conveyor assembly is in the planar operative position. To fold the conveyor assembly, the secondary pivot shaft and the supporting keyed fulcrum members are secured to the ends of the piston portion of the hydraulic cylinders when the piston portions are in an extended position. Before the folding operation, the brace member, secured to the pivot frame supports and attached to the anchor brackets on the cylinder support member, is disconnected from the anchor brackets on the cylinder support member, and the conveyor belt, screw or chain is loosened on the conveyor assembly. Also, the legs of the pivot frame supports are secured to the secondary shaft and to the primary pivot point provided by the cylinder support member secured to the plate member mounted to the end of the lower truss portion.

As the piston member portions are moved from the extended to a collapsed position, the secondary shaft is rotated in a clockwise movement. This movement causes the pivot frame support legs mounted to the cylinder support member to rotate the pivot support frame about the primary pivot point. This movement of the hinge assembly rotates the upper truss member portion to be positioned approximately in an upward perpendicular plane relative to the plane of the lower truss member portion. Also, this upward rotation of the upper truss member simultaneously lowers the legs of the pivot frame supports to lower the lower truss portion adjacent the ground. When this perpendicular position is achieved, the leg portions of the pivot frame supports are disengaged from the upper truss support frame by removal of the pin member therefrom. The hydraulic cylinders then move the piston portions to an extended position from the collapsed position, and the over-centered toggle action of the fulcrum arms on the secondary pivot shaft further rotates the pivot frame supports and the upper truss member portion about the primary pivot point wherein the upper truss portion is in a plane substantially parallel to the plane of the lower truss portion. In such a folded position, the conveyor assembly may be readily attached to a vehicle for movement from one job site to another.

The present invention consists of certain novel features and structural details hereinafter fully described, illustrated in the accompanying drawings, and specifically pointed out in the appended claims, it being understood that various changes in the details may be made without departing from the spirit or sacrifice in any of the advantages of the present invention.

DESCRIPTION OF THE DRAWINGS

The foregoing description and other characteristics, objects, features and advantages of the present invention will become more apparent upon consideration of the following detailed description, having reference to the accompanying drawings wherein:

FIG. 1 is a side elevation view illustrating an elongated belt conveyor assembly type to which the invention relates and showing the conveyor truss assembly and pivotal hinge assembly in accordance with the present invention;

FIG. 2 is a side elevational view illustrating the elongated belt conveyor assembly in operative position in accordance with the present invention;

DESCRIPTION OF THE PREFERRED EMBODIMENT

Figure 3:
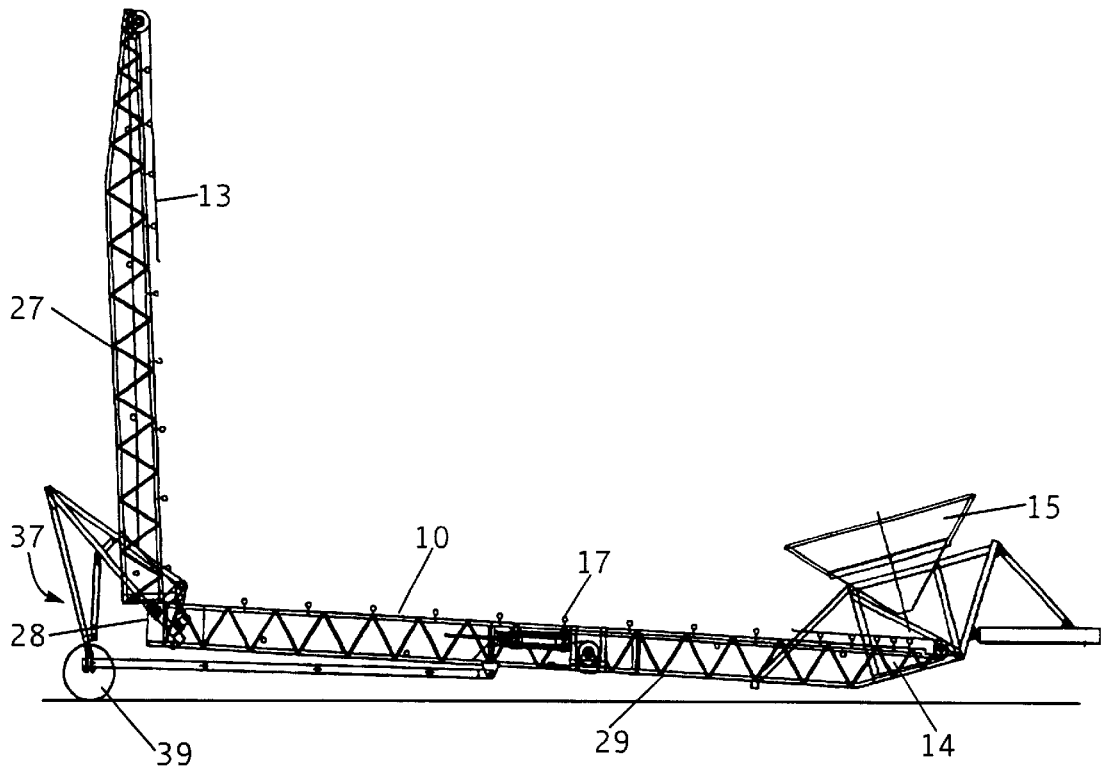
FIG. 3 is a side elevational view illustrating the position of the upper truss member portion in a vertical position relative to the lower member portion in accordance with the present invention.

Referring now to the drawings wherein like numerals have been used throughout the several views to designate the same or similar parts, the present invention is directed to a conveyor assembly 10, as shown in FIGS. 1–4, and to a novel pivotal hinge assembly or mechanism 25 (FIG. 5) structurally arranged to engage the conveyor assembly 10 to provide and permit the fold-over of a portion of the conveyor assembly to a plane substantially parallel relative to the plane of the non-folded portion of the conveyor assembly 10. The conveyor assembly 10 may be a belt, screw or chain type conveyor assembly. However, the drawings have been illustrated to show a belt conveyor assembly. The belt conveyor assembly 10 includes a conveyor truss frame 12 which supports a conveyor belt member 13 which transports the aggregate materials on the belt conveyor from a lower entrance point 14, as shown in FIG. 2. The lower entrance point 14 may include a hopper member 15 which directs and deposits the aggregate onto the conveyor belt member 13 which is elevated to a discharge end 16 of the conveyor assembly 10. Generally, the conveyor assembly 10 would be operated at a slope of between about 10° to 30°, with a preferred slope of between about 15° to 20°.

As schematically shown in FIGS. 1–4, the belt conveyor assembly 10 includes a belt tightening mechanism 17 which permits the tightening and loosening of the conveyor belt, screw or chain, as is known in the art. When it is desired to move the belt conveyor assembly 10 from one job site, as shown in FIG. 2, to another job site, the hinge assembly or mechanism 25 is incorporated and attached to the belt conveyor assembly 10, as will hereinafter be described.

Figure 4:
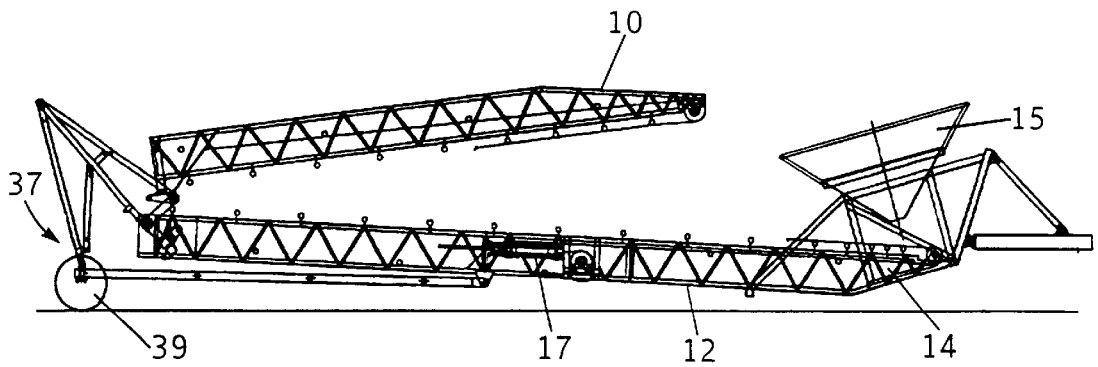
FIG. 4 is a side elevational view illustrating the fold-over position of the upper member portion in a vertical plane relative to the plane of the lower truss portion in accordance with the present invention.
Figure 5:
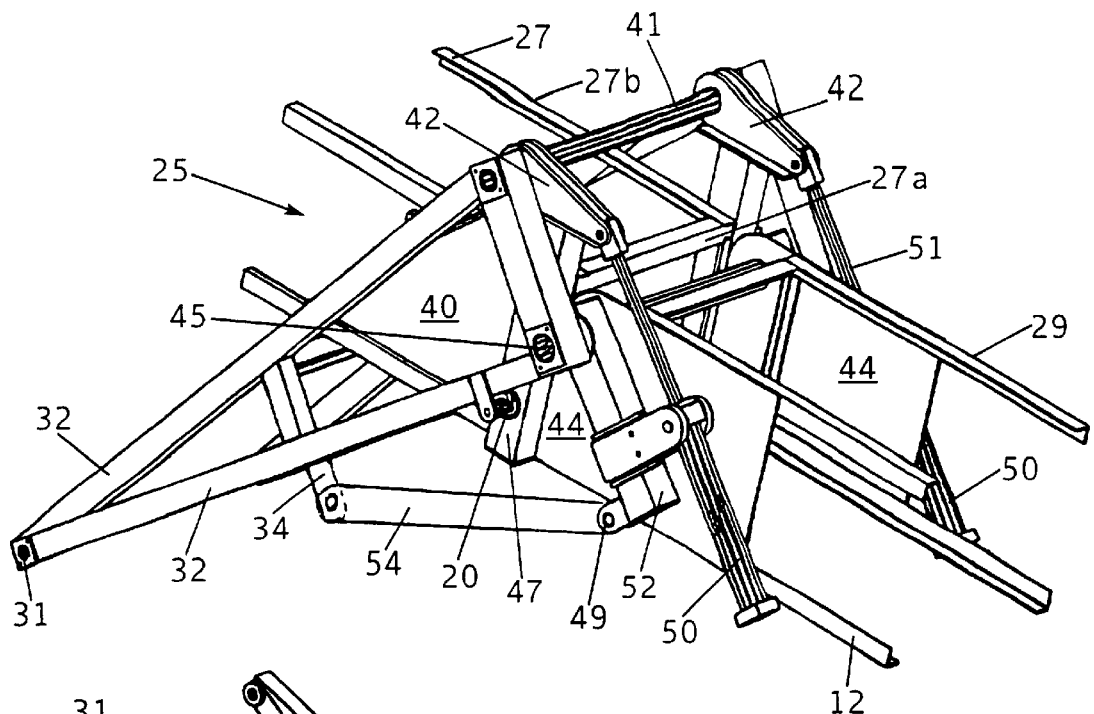
FIG. 5 is a perspective view illustrating the mounting of the hinge assembly to the belt conveyor assembly in accordance with the present invention.
Figure 6:
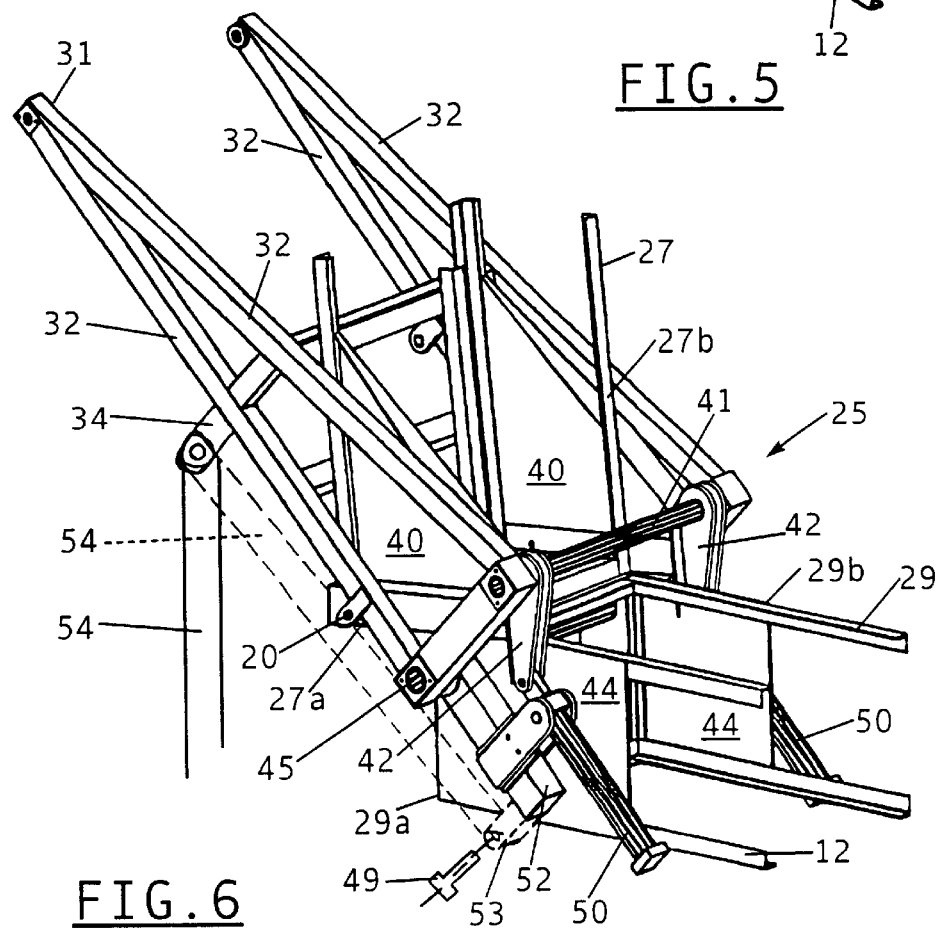
FIG. 6 is perspective view illustrating the position of the hinge assembly during the movement of the upper truss member portion to a vertical position relative to the lower truss member portion in accordance with the present invention.
Figure 7:
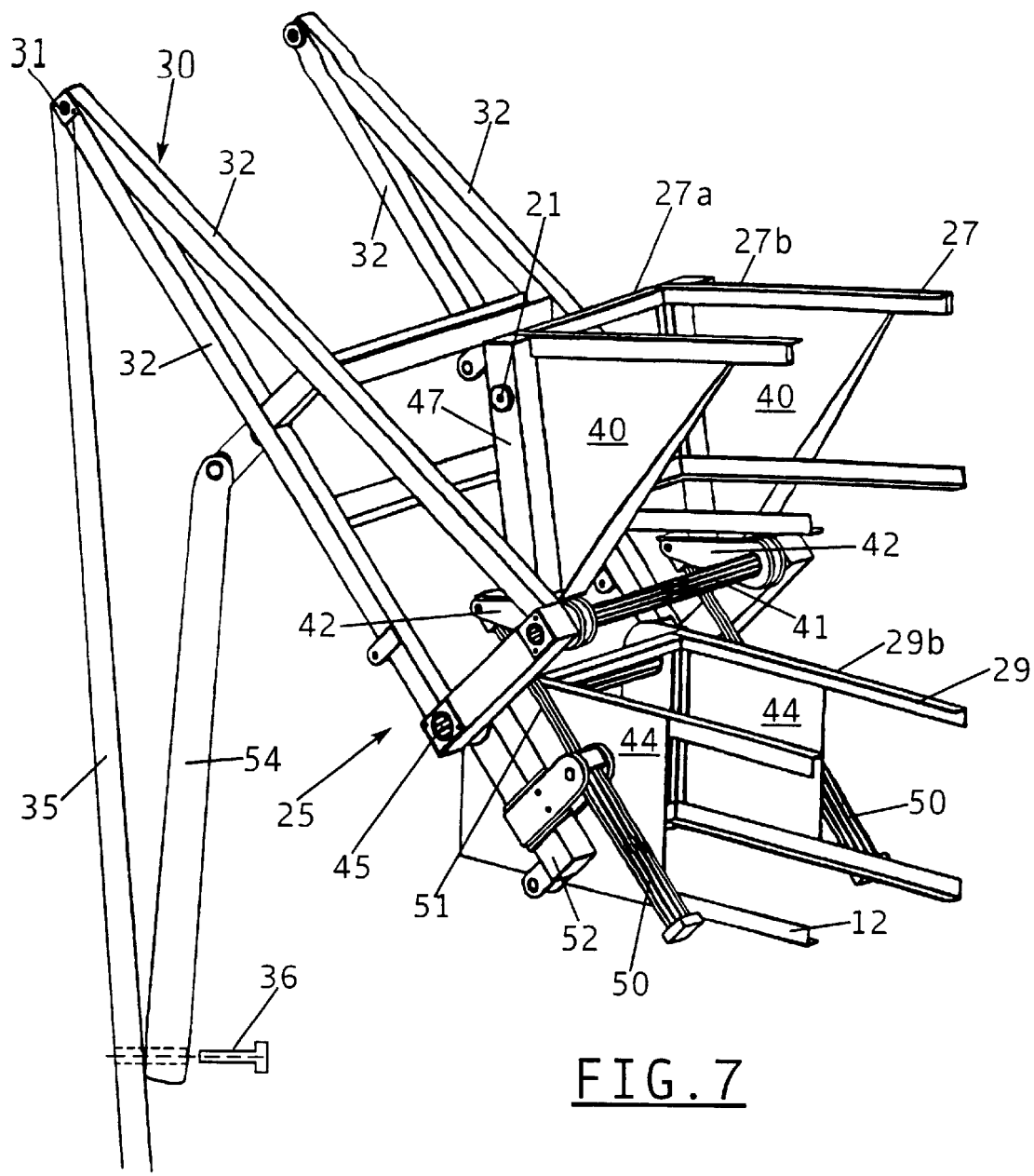
FIG. 7 is a perspective view illustrating the movement of the hinge assembly to a position wherein the upper truss member portion is in a substantially parallel position with respect to the plane of the lower truss member portion in accordance with the present invention.

As shown in FIGS. 5–7, the hinge assembly or mechanism 25 is mounted to the conveyor truss frame 12 of the belt conveyor assembly 10 and structurally arranged to permit the pivotal movement of the upper truss or forward member portion 27 to a foldable position located in a plane substantially parallel with respect to the plane of a lower truss or rearward member portion 29, as shown in FIGS. 4 and 7. At the junction 28 (FIG. 3) in the belt conveyor assembly 10 which separates the upper truss member portion 27 from the lower truss member portion 29, the hinged assembly or mechanism 25 is structurally arranged to be secured to the conveyor assembly 10 in accordance with the present invention, as shown in FIGS. 5–7.

Figure 8:
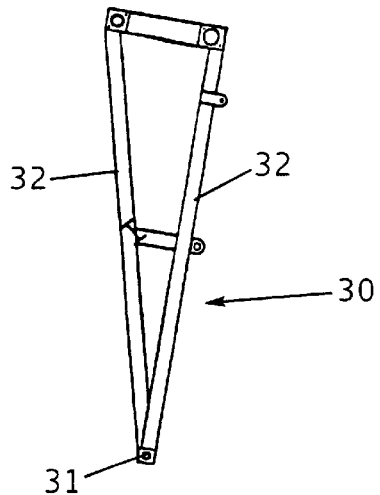
FIGS. 8–11 illustrate perspective views of the pivot frame support, the bottom pivot frame member, the axle brace support member and the brace member, respectively, in accordance with the present invention.
Figure 9:
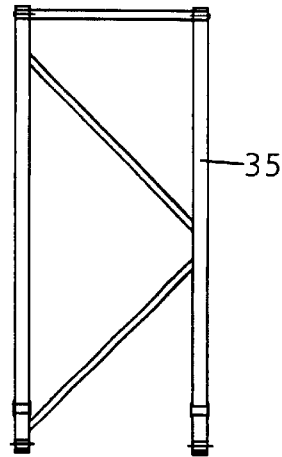
Figure 10:
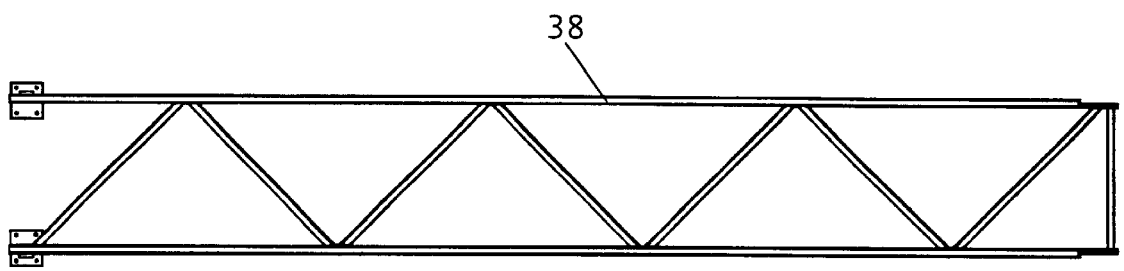

The hinge assembly 25, which accomplishes the desired pivot fold-over and vertical hinge support of the upper truss member section relative to the lower truss member portion of the conveyor assembly, is comprised of a pair of pivot frame support members 30 which are, preferably, triangular in shape with the vertex angle 31 of the pivot frame support members (FIG. 8) anchored to a bottom pivot frame member 35 (FIG. 9) which is coupled to a carriage unit 37, as shown in FIGS. 2–4. The carriage unit 37 is comprised of an axle (not shown) having a pair of tires 39 thereon and a forward extending axle brace member 38 (FIG. 10) which secures the axle and the carriage unit 37 relative to the belt conveyor assembly 10.

The rearward end 27a of the upper truss member portion 27 abuts against the forward end 29a of the lower truss member portion 29 at the junction 28 to maintain a planar conveyor surface when the belt conveyor assembly is in the elongated operating position. The rearward end portion 27b of the upper truss member portion 27 includes side mounted support plates 40 which support a secondary pivot shaft 41 having fulcrum arms 42 keyed thereon. The secondary pivot shaft 41, preferably, extends between the side mounted support plates 40 and across the width of the conveyor truss frame 12. The forward end portion 29a of the lower truss member portion 29 includes plate members 44 secured on opposite sides thereof which mount stub shafts 46 which cooperate with selected pivot frame legs 32 of the pivot frame support 30 to provide a primary pivot point 45 for the pivot frame support 30 relative to the lower truss assembly portion 29, as will hereinafter be described.

Figure 11:
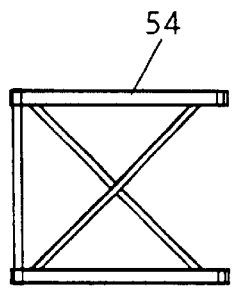

As shown in the drawings, the pivot frame supports 30 include leg portions 32 which are respectively mounted and secured to the primary pivot point 45 and stub shafts 46 and to the secondary shaft member 41, as shown in FIGS. 5, 6 and 7 of the drawings. Also, when the conveyor assembly 10 is in the elongated operative position, the pivot frame support 30 is secured by a pin 20 (FIG. 6) structurally arranged to be received by an opening 21 (FIG. 7) in the upper truss support frame 47. Hydraulic cylinders 50 are respectively mounted to the plate members 44 by cylinder support members 52. The cylinder support members 52 include an anchor bracket 53 which is structurally arranged to receive a brace member 54 (FIG. 11) which extends from a bracket 34 located on the pivot frame support 30. The brace member 54 is secured to the cylinder support member by pin 49 (FIG. 6) to maintain the hinge assembly in a rigid fixed condition wherein the upper and lower truss portions are in abutting relationship when the belt conveyor assembly 10 is in its elongated, operative position.

When it is desired to fold-over the belt conveyor assembly 10 from the position as shown in FIGS. 2 and 5 to the position as shown in FIGS. 4 and 7, the brace member 54 is first decoupled from the cylinder support member 52 by removal of pin 49 and permitted to move to a position as shown from the dotted lines to the solid lines, as shown in FIG. 6. When the conveyor is in the elongated operative position, the fulcrum arms 42 are keyed to the secondary shaft 41 mounted by the support plates 40 of the upper truss member portion 27 and are secured to the piston portions 51, when the pistons are in an extended position. The conveyor belt, screw or chain is then loosened on the conveyor assembly by releasing the tightening mechanism 17. When the piston member portions 51 are then moved from the extended to a collapsed position, as shown in FIG. 6, the secondary shaft 41 is rotated in a clockwise movement. This clockwise movement permits the pivot support legs and the pivot frame support to rotate about the primary pivot point 45 to a position wherein the upper truss assembly portion 27 is positioned at approximately a perpendicular plane relative to the plane of the lower truss member portion 29, the position as shown in FIGS. 3 and 6. As shown in FIG. 3, the movement of the pivot frame supports 30 to raise the upper truss portion 27 vertically causes the lower truss portion 29 to be lowered to a position adjacent the ground to permit towing thereof.

When the vertical position is reached, as shown in FIGS. 3 and 6, the pivot frame support 30 (FIGS. 6 and 7) has the pin 20 removed from opening 21 to decouple the frame supports from the upper truss support frame 47. Further movement of the piston portions 51 of the hydraulic cylinders 50 from the collapsed to an extended position, as shown in FIG. 7 and partially shown in FIG. 4, provides an over-center toggle action of the fulcrum arms keyed to the secondary shaft and results in the further clockwise movement of the pivot frame supports 30 which further rotates the upper truss member portion 27 to a fold-over collapsed position wherein it is positioned in a plane substantially parallel to the plane of the lower truss member portion 29. As shown in FIG. 7, when the fold-over position is achieved, the brace member 54 is secured to the bottom pivot frame member 35 by a fastening pin 36. When the belt conveyor assembly is in this collapsed fold-over position, the conveyor assembly may be readily towed by a vehicle from one job site to another.

The present invention has been described with reference to a preferred embodiment as illustrated in the drawings. Modifications and alterations may become apparent to a person skilled in the art after reading and understanding the specification and it is intended that the specification and drawings include modifications and alterations with the scope of the appended claims.

I claim:

1. For use with a conveyor assembly having an upper truss member portion and a lower truss member portion in abutting relationship, with each member portion having support plates thereon, including in combination:

a pair of spaced apart pivot frame supports each having a first leg portion rotatably secured to the support plates of the lower truss member portion to provide a primary pivot point therebetween and each having a second leg portion secured to a secondary pivot point supported by the support plates on the upper truss member portion;

a carriage unit engageable with the conveyor assembly and providing an anchor for said pivot frame support;

said secondary pivot point including a secondary shaft mounted to the support sides of the upper truss member and including fulcrum arms secured on said secondary shaft to rotate the shaft;

hydraulic cylinder means mounted to the support plates on the lower truss member portion, with said hydraulic cylinder means having piston portions secured to said fulcrum and operable between an extending position and a collapsed position, whereas when said piston portions are moved from an extended position and the conveyor assembly and the upper truss member portion and the lower truss member portion are in operative abutting relationship, to a collapsed position, the rotational movement of said fulcrum arms on said secondary pivot shaft rotates said pivot frame supports about the primary pivot point on the lower truss assembly, to position the upper truss member portion in a substantially vertical configuration with respect to the lower truss member portion; and whereas the further movement of said piston portions from said collapsed to said extended position, the further rotation of said fulcrum arms rotates the pivot frame support members about said primary pivot point to position the upper truss member portion in substantially a parallel position with respect to the plane of the lower truss member portion.

2. The conveyor assembly in accordance with claim 1, wherein the conveyor assembly is operable between a slope of about 10° to 30° relative to the surface supporting the conveyor assembly.

3. The conveyor assembly in accordance with claim 1, wherein the conveyor assembly includes a belt member.

4. The conveyor assembly in accordance with claim 1, wherein the conveyor assembly includes a screw member.

5. The conveyor assembly in accordance with claim 1, wherein the conveyor assembly includes a chain member.

6. The conveyor in accordance with claim 1, wherein said pivot frame supports are triangular in configuration, with the vertex angle of said frame supports being secured to said carriage unit.

7. The conveyor assembly in accordance with claim 1, wherein when the upper truss member portion is rotated and positioned in said vertical perpendicular position, the lower truss member portion is lowered to be positioned substantially parallel with the surface which supports the conveyor assembly.

8. The conveyor assembly in accordance with claim 1, wherein the length of the upper truss member portion is within the range of about 30 to 50 percent of the length of the lower truss member portion.

9. The conveyor assembly in accordance with claim 8, wherein the length of the upper truss member portion is about 40 percent of the length of the lower truss member portion.

* * * * *